(12) United States Patent
Casci et al.

(10) Patent No.: US 10,029,239 B2
(45) Date of Patent: Jul. 24, 2018

(54) METHODS OF PRODUCING SAPO-56, AN AFX-CONTAINING MOLECULAR SIEVE

(71) Applicant: Johnson Matthey Public Limited Company, London (GB)

(72) Inventors: John Casci, Billingham (GB); Alessandro Turrina, Billingham (GB); Raquel Garcia Salas, Billingham (GB); Paul Wright, St. Andrews (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 15/493,732

(22) Filed: Apr. 21, 2017

(65) Prior Publication Data

US 2017/0304813 A1    Oct. 26, 2017

Related U.S. Application Data

(60) Provisional application No. 62/326,260, filed on Apr. 22, 2016.

(51) Int. Cl.
*C01B 39/54* (2006.01)
*B01J 29/85* (2006.01)
*C01B 39/04* (2006.01)

(52) U.S. Cl.
CPC .............. *B01J 29/85* (2013.01); *C01B 39/54* (2013.01); *C01B 39/04* (2013.01)

(58) Field of Classification Search
CPC ........... C01B 39/04; C01B 39/54; B01J 29/85
See application file for complete search history.

(56) References Cited

U.S. PATENT DOCUMENTS 4,508,837 A * 4/1985 Zones .................... B01J 29/04
                                                           423/326
5,194,235 A * 3/1993 Zones .................... C01B 39/48
                                                           423/704
(Continued)

FOREIGN PATENT DOCUMENTS

WO       199947260 A1    9/1999
WO      2007077462 A1    7/2007
(Continued)

OTHER PUBLICATIONS

Davis et al.; Zeolite and Molecular Sieve Synthesis; Chem. Mater. 1992, 4, 756-768.
(Continued)

*Primary Examiner* — David M Brunsman (57) ABSTRACT

The invention relates to a method of preparing SAPO-56, (AFX) using a lower alkyl amine, preferably trimethylamine, and a 1,4-diazabicyclo [2.2.2]octane derivative, preferably comprising either 1,4-(1,4-diazabicyclo[2.2.2]octane) butyl cations or 1,5-(1,4-diazabicyclo[2.2.2]octane)pentyl cations, as structure directing agents (SDAs). A lower alkyl ammonium hydroxide, such as tetrabutylammonium hydroxide (TBAOH), can be used to control the pH. The invention also relates to SAPO-56 comprising a lower alkyl amine, such as trimethylamine, and a 1,4-diazabicyclo [2.2.2]octane derivative, such as a compound comprising either 1,4-(1,4-diazabicyclo[2.2.2]octane)butyl cations or 1,5-(1,4-diazabicyclo[2.2.2]octane) pentyl cations.

25 Claims, 3 Drawing Sheets

(56) References Cited

U.S. PATENT DOCUMENTS

| | | |
|---|---|---|
| 5,370,851 A | 12/1994 | Wilson |
| 2009/0007553 A1 | 1/2009 | Simon, III et al. |

FOREIGN PATENT DOCUMENTS

| | | |
|---|---|---|
| WO | 2011080525 A1 | 7/2011 |
| WO | 2012166868 A1 | 12/2012 |
| WO | 2013050784 A2 | 4/2013 |
| WO | 2013088128 A1 | 6/2013 |
| WO | 2013088132 A1 | 6/2013 |
| WO | 2013088133 A1 | 6/2013 |
| WO | 2015085300 A1 | 6/2015 |
| WO | 2016128720 A1 | 8/2016 |

OTHER PUBLICATIONS

Wang et al.; Hollow nanocrystals of silicoaluminophosphate molecular sieves synthesized by an aminothermal co-templating strategy; CrystEngComm, 2016, 18, 1000-1008.

Turrina et al.; Retrosynthetic Co-Templating Method for the Preparation of Silicoaluminophosphate Molecular Sieves; Chem. Mater. 2016, 28, 4998-5012.

Maple et al.; Synthesis and characterisation of aluminophosphate-based zeotype materials prepared with $\alpha,\omega$-bis(N-methylpyrrolidinium)alkane cations as structure-directing agents; Dalton Trans., 2007,0, 4175-4181.

\* cited by examiner

METHODS OF PRODUCING SAPO-56, AN AFX-CONTAINING MOLECULAR SIEVE

CROSS-REFERENCE TO RELATED APPLICATIONS

This application claims priority to U.S. Provisional Patent Application No. 62/326,260, filed on Apr. 22, 2016, which is incorporated herein by reference.

FIELD OF INVENTION

The present invention relates to methods of producing SAPO-56, a silicoaluminophosphate molecular sieve having AFX-topology, using trimethylamine and either 1,4-(1,4-diazabicyclo[2.2.2]octane)butyl cations or 1,5-(1,4-diazabicyclo[2.2.2]octane) pentyl cations as structure directing agents (SDAs), and as-prepared SAPO-56AP containing these SDAs. SAPO-56 was formed from as-produced SAPO-56AP.

BACKGROUND OF THE INVENTION

A molecular sieve having an AFX framework was first synthesised as an aluminosilicate using diquaternary ammonium compounds, such as diDABCO-C4 or diQUIN-C4 (quinuclidine) as structure-directing agents (S. I. Zones, U.S. Pat. No. 4,508,837, 1985. M. E. Davis, R. F. Lobo, Chem. Mater., 1992, 4, 756-768. R. F. Lobo, S. I. Zones, M. E. Davis, J. Inclus. Phenom., 1995, 21, 47-48. R. F. Lobo, Chem. Mater., 1996, 8, 2409-2411). The silicoaluminophosphate version of AFX (SAPO-56) was reported to form using N,N,N',N'-tetra-methyl-hexane-1,6-diamine (S. T. Wilson, R. W. Broach, C. S. Blackwell, C. A. Bateman, N. K. McGuire, R. M. Kirchner, *Microporous Mesoporous Mater.*, 1999, 28, 125-137), and α,ω-bis(N-methylpyrrolidinium)alkane (M. J. Maple, C. D. Williams, *Dalton Trans.*, 2007, 4175-4181). Recently, SAPO-56 was prepared by aminothermal synthesis containing triethylamine and trimethylamine in the synthesis (D. Wang, M. Yang, W. Zhang, D. Fan, P. Tian, Z. Liu, Cryst Eng Comm. 2016, 18, 1000-1008).

In typical synthesis techniques, molecular sieve crystals precipitate from a reaction mixture which contains the framework reactants (e.g., a source of silica, a source of alumina and a source of hydroxide ions for aluminosilicates; or (a source of silica, a source of alumina and a source phosphate for SAPOs), and an SDA. Such synthesis techniques usually take several days (depending on factors such as crystallization temperature) to achieve the desired crystallization. When crystallization is complete, the solid precipitate containing the zeolite crystals is separated from the mother liquor which is discarded. This discarded mother liquor contains unused SDA, which is often degraded due to harsh reaction conditions, and unreacted silica.

There is a need to develop new methods to produce molecular sieves that can be performed more economically, and more efficiently. One of the ways to accomplish this can be through the use of different SDAs.

SUMMARY OF THE INVENTION

In a first aspect of the invention, provided is a method for preparing silicoaluminophosphates having AFX topology (SAPO-56) using a lower alkyl amine, such as trimethylamine, and either 1,4-(1,4-diazabicyclo[2.2.2]octane)butyl dibromide (diDABCO-C4) or 1,5-(1,4-diazabicyclo[2.2.2] octane)pentyl dibromide (diDABCO-C5) as structure directing agents (SDAs). Tetrabutylammonium hydroxide (TBAOH) was used as a pH modifier for the SAPO preparation.

In a second aspect of the invention, provided are: (1) SAPO-56AP containing trimethylamine and 1,4-(1,4-diazabicyclo[2.2.2]octane)butyl cations within the SAPO-56 structure; and (2) SAPO-56AP containing trimethylamine and 1,5-(1,4-diazabicyclo[2.2.2] octane)pentyl cations, within the SAPO-56 structure.

In a third aspect of the invention, provided are compositions prepared for manufacturing a molecular sieve having an AFX framework of the first aspect of the invention.

In a fourth aspect of the invention, provided is catalytic composition comprising SAPO-56 made by the method of the first aspect of the invention.

DETAILED DESCRIPTION OF THE INVENTION

As used in this specification and the appended claims, the singular forms "a", "an" and "the" include plural referents unless the context clearly indicates otherwise. Thus, for example, reference to "a catalyst" includes a mixture of two or more catalysts, and the like.

As used herein, the term "AFX" refers to an AFX topological type as recognized by the International Zeolite Association (IZA) Structure Commission. Other crystalline phases may also be present, but the primary crystalline phase comprises at least about 90 weight percent AFX, preferably at least about 95 weight percent AFX, and even more preferably at least about 97 or at least about 99 weight percent AFX. Preferably, the AFX molecular sieve is substantially free of other crystalline phases and is not an intergrowth of two or more framework types. By "substantially free" with respect to other crystalline phases, it is meant that the molecular sieve contains at least 99 weight percent AFX.

The term "calcine", or "calcination", means heating the material in air or oxygen. This definition is consistent with the IUPAC definition of calcination. (IUPAC. Compendium of Chemical Terminology, 2nd ed. (the "Gold Book"). Compiled by A. D. McNaught and A. Wilkinson. Blackwell Scientific Publications, Oxford (1997). XML on-line corrected version: http://goldbook.iupac.org (2006-) created by M. Nic, J. Jirat, B. Kosata; updates compiled by A. Jenkins. ISBN 0-9678550-9-8. doi:10.1351/goldbook.) Calcination is performed to decompose a metal salt and promote the exchange of metal ions within the catalyst and also to adhere the catalyst to a substrate. The temperatures used in calcination depend upon the components in the material to be calcined and generally are between about 400° C. to about 900° C. for approximately 1 to 8 hours. In some cases, calcination can be performed up to a temperature of about 1200° C. In applications involving the processes described herein, calcinations are generally performed at temperatures from about 400° C. to about 700° C. for approximately 1 to 8 hours, preferably at temperatures from about 400° C. to about 650° C. for approximately 1 to 4 hours.

The term "about" means approximately and refers to a range that is optionally ±25%, preferably ±10%, more preferably, ±5%, or most preferably ±1% of the value with which the term is associated.

When a range, or ranges, for various numerical elements are provided, the range, or ranges, can include the values, unless otherwise specified.

In a first aspect of the invention, provided is a method of making a molecular sieve catalyst comprising silicoaluminophosphate 56 (SAPO-56), preferably in substantially pure form. The method generally comprises forming a mixture comprising a silicon component, an aluminum component, a phosphorus component, and two templates (structure directing agents). This mixture can go through an optional aging period before being subjected to a hydrothermal treatment at an elevated temperature. The product formed from the hydrothermal treatment contains the two SDAs. This product can be calcined at an elevated temperature to remove the two SDA and form SAPO-56.

A number of silicon compounds and their mixtures can be used as the silicon component for the method of the present invention. The silicon compounds include, but are not limited to silica sol silica gel, colloidal silica, fumed silica, silicic acid, tetraethyl silicate, tetramethyl silicate, and mixtures thereof. A preferred silicon component comprises a material selected from the group consisting of silica sol, silica gel, colloidal silica, fumed silica, silicic acid, and mixtures thereof.

Many aluminum compounds and their mixtures are suitable for use as the aluminum component in the present invention. The aluminum compounds include, but are not necessarily limited to aluminum oxide, boehmite, pseudo boehmite, aluminum hydroxy chloride, aluminum alkoxides such as aluminum tri-isopropoxide, aluminum tri-ethoxide, aluminum tri-n-butoxide and aluminum tri-isobutoxide, and mixtures thereof. A preferred aluminum component comprises a material selected from the group consisting of aluminum hydroxide, boehmite and pseudo boehmite.

The phosphorus compounds suitable for use as the phosphorus component include but are not necessarily limited to orthophosphoric acid, phosphorus acid, trimethyl phosphate, triethyl phosphate, and mixtures thereof. A preferred phosphorus component comprises orthophosphoric acid ($H_3PO_4$). Another preferred phosphorus component comprises the commercially available 85 wt % phosphoric acid (in water). Alternately, phosphorus oxides ($P_2O_3$, $P_2O_4$, $P_2O_5$, and $POCl_3$) can be used, preferably after they are dissolved in a suitable solvent such as water.

A suitable organic template comprises a lower alkyl amine and a 1,4-diazabicyclo [2.2.2]octane derivative. The lower alkyl amine is preferably trimethylamine or N,N-dimethylethylamine, more preferably trimethyl amine. When N,N-dimethylethylamine is used, AlPO-5 can be present in the product as an impurity. The 1,4-diazabicyclo [2.2.2]octane derivative comprises either 1,4-(1,4-diazabicyclo[2.2.2]octane)butyl cations or 1,5-(1,4-diazabicyclo [2.2.2]octane)pentyl cations. The corresponding anions can be acetate, bicarbonate, bromide, carbonate, carboxylate, chloride, fluoride, hydroxide, iodide, sulfate and tetrafluoroborate, preferably bromide. Preferably the 1,4-diazabicyclo [2.2.2]octane derivative is 1,4-(1,4-diazabicyclo[2.2.2] octane)butyl dibromide (diDABCO-C4) or 1,5-(1,4-diazabicyclo[2.2.2]octane)pentyl dibromide (diDABCO-C5).

A solvent can be mixed with the organic template before the template is added to the reaction mixture. Preferably, the organic template is completely mixable with, or soluble in, the solvent. Suitable solvents include but are not necessarily limited to water, methanol, ethanol, n-propanol, iso-propanol, C4 alcohols, ethylene glycol, 1,2-propylene glycol, 1,3-propylene glycol and mixtures thereof. A preferred solvent comprises water.

The silica component and the phosphorus component can be mixed in a suitable solvent to form a first mixture of uniform composition and texture. Adequate mixing, stirring, or agitation usually is used. The aluminum component can be added to this mixture, followed by the first organic template (SDA1), either 1,4-(1,4-diazabicyclo[2.2.2]octane) butyl dibromide (diDABCO-C4) or 1,5-(1,4-diazabicyclo [2.2.2]octane)pentyl dibromide (diDABCO-C5). A lower alkyl amine (SDA2), such as trimethyl amine, can then be added and the mixture can be stirred for several minutes. A suitable base, such as tetrabutylammonium hydroxide or tetrapropylammonium hydroxide, can be added to control the pH. Additionally, suitable bases include tetraethylammonium hydroxide, tetrapenthylammonium hydroxide and tetrahexylammonium hydroxide. Pure SAPO-56 was produced when tetrabutylammonium hydroxide or tetrapropylammonium hydroxide were used.

In order to make a molecular sieve comprising SAPO-56, the molar ratios of the components in the mixture must be controlled and maintained. Before being subjected to conditions effective to produce the molecular sieve product, the final reaction mixture, excluding any other organic or inorganic moieties or species which can be present is characterized by a general formula as follows:

| | |
|---|---|
| P/A | 0.5-0.99 |
| $MeO_2$/A | 0.02-1.0 |
| SDA1/A | 0.1-0.6 |
| SDA2 (lower alkyl amine)/A | 0.1-0.6 |
| Lower alkyl ammonia hydroxide/A | 0.1-0.6 |
| $H_2O$/A | 20-200 | where P the source of phosphorous and is calculated as being in the oxide form ($P_2O_5$), A is Al, Fe, Cr, B, Ga or combinations thereof and is calculated as being in the oxide form ($A_2O_3$); Me is Si, Ge, Mg or combinations thereof and is calculated as being in the oxide form ($MO_2$), SDA1 is a 1,4-diazabicyclo [2.2.2]octane derivative and SDA2 is a lower alkyl amine.

When A is Al and Me is silica, the final reaction mixture, excluding any other organic or inorganic moieties or species which can be present is characterized by a general formula as follows:

A $SiO_2$:1Al(OH)$_3$:B$H_3PO_4$:C$H_2O$:D compound comprising 1,4-(1,4-diazabicyclo[2.2.2]octane)butyl cations or 1,5-(1,4-diazabicyclo[2.2.2]octane)
pentyl cations:E lower alkyl amine:F lower
alkyl ammonium hydroxide.

The molar ratio of silicon to aluminum hydroxide can be in the range of from about 0.01 to about 0.50, preferably from about 0.25 to about 0.45, more preferably from about 0.3 to about 0.40.

The molar ratio of aluminum hydroxide to $H_3PO_4$ can be in the range of from about 0.5 to about 0.99, preferably from about 0.55 to about 0.75, more preferably from about 0.6 to about 0.7.

The molar ratio of aluminum hydroxide to water can be in the range of from about 10 to about 100, preferably from about 30 to about 60, more preferably about 35 to about 45.

The molar ratio of aluminum hydroxide to a compound comprising 1,4-(1,4-diazabicyclo[2.2.2]octane)butyl cations or 1,5-(1,4-diazabicyclo[2.2.2]octane)pentyl cations can be in the range of from about 0.05 to about 0.30, preferably from about 0.10 to about 0.15.

The molar ratio of aluminum hydroxide to lower alkyl amine can be in the range of from about 0.05 to about 0.5, preferably from about 0.15 to about 0.35, more preferably about 0.18 to 0.25.

The molar ratio of aluminum hydroxide to lower alkyl ammonium hydroxide can be in the range of from about 0.05 to about 0.5, preferably from about 0.15 to about 0.35, more preferably from about 0.16 to about 0.24.

The molar ratio of a compound comprising 1,4-(1,4-diazabicyclo[2.2.2]octane)butyl cations or 1,5-(1,4-diazabicyclo[2.2.2] octane)pentyl cations to silica can be in the range of about 0.05 to about 1.

The molar ratio of the lower alkyl amine to silica can be in the range of about 0.01 to about 1.

It is preferable to maintain the pH value of the final reaction mixture in the range from about 5.5 to about 8.5, preferably from about 6.5 to about 7.5. The pH value of a mixture can be adjusted, if desired, by adding an appropriate amount of a base such as tetrabutylammonium hydroxide or tetrapropylammonium hydroxide, to control the pH. Other suitable bases include tetraethylammonium hydroxide, tetrapenthylammonium hydroxide and tetrahexylammonium hydroxide. However, use of one or more of these other suitable bases may not result in the formation of pure SAPO-56.

It is preferable to use adequate mixing, blending, stirring, or agitation to provide a uniform composition throughout the mixture. The use of a concentration or composition gradient should be minimized because such a gradient could result in the formation of different molecular sieve products.

Preferably, a constant temperature is maintained during the preparation of the mixture. Cooling or heating may be required to provide a constant temperature environment. A suitable temperature for preparation of a mixture can be in the range of from about 20° C. to about 80° C., preferably from about 25° C. to about 50° C. Pressure is usually not critical for preparing a mixture unless one or more gases are used to control other reaction parameters, such as pH, temperature, or concentration.

Preferably, the overall process will have an overall yield on silica of ≥about 60%, for example ≥about 70%, ≥about 80%. Preferably, the overall process will have an overall yield on SDA of ≥about 40%, for example ≥about 60%, ≥about 80%, ≥about 90%, ≥about 95%, or ≥about 99%.

Reaction temperatures, mixing times and speeds, and other process parameters that are suitable for conventional AFX synthesis techniques are also generally suitable for the present invention. Generally, the reaction mixture can be maintained at an elevated temperature until the SAPO-56 crystals are formed. The hydrothermal crystallization can be conducted under autogenous pressure, at a temperature between about 120-220° C., for example between about 150 and 200° C., for duration of several hours, for example, about 0.1-10 days, and preferably from about 1-4 days. Preferably, the SAPO-56 is prepared using stirring or agitation.

During the hydrothermal crystallization step, crystals of SAPO-56 can be allowed to nucleate spontaneously from the reaction mixture. The use of SAPO-56 crystals, other AFX containing materials, or more generally other ABC-6 framework structure materials in which the repeated stacking sequence can be described using only double-6-rings (D6Rs), such as AFT, GME and SFW, as seed material can be advantageous in decreasing the time necessary for complete crystallization to occur. When used as seeds, SAPO-56, other AFX containing crystals or other materials which framework belongs to the ABC-6 family, preferably those in which the repeated stacking sequence can be described using double-6-rings (i.e. AFT, GME, SFW) can be added in an amount between 0.1 and 10% of the weight of silica used in the reaction mixture.

Once the SAPO-56 crystals have formed, the solid product can be separated from the reaction mixture by standard separation techniques such as filtration. The SAPO-56 crystals are water-washed and then dried, for several second to a few minutes (e.g., 5 second to 10 minutes for flash drying) or several hours (e.g., about 4-24 hours for oven drying at 75-150° C.), to obtain as-synthesized SAPO-56 crystals having a AFX topological type framework and an SDA within the crystals. The drying step can be performed at atmospheric pressure or under vacuum.

It will be appreciated that the foregoing sequence of steps, as well as each of the above-mentioned periods of time and temperature values are merely exemplary and may be varied.

The SAPO-56 zeolite crystals produced in accordance with this process can be uniform, with little to no twinning and/or multiple twinning or may form agglomerates.

The SAPO-56 crystals produced in accordance with the methods described herein can have a mean crystalline size of about 0.01 to about 5 μm, for example about 0.5 to about 5 μm, about 0.1 to about 1 μm, and about 1 to about 5 μm. Large crystals can be milled using a jet mill or other particle-on-particle milling technique to an average size of about 1.0 to about 1.5 micron to facilitate washcoating a slurry containing the catalyst to a substrate, such as a flow-through monolith.

In certain aspects of the invention, provided is a catalyst comprising SAPO-56 that is free or essentially free of any exchanged metal, particularly post-synthesis exchanged or impregnated metals. SAPO-56 preferably can comprise one or more catalytic metal ions exchanged or otherwise impregnated into the channels and/or cavities of the zeolite. Examples of metals that can be post-zeolite synthesis exchanged or impregnated include transition metals, including copper, nickel, zinc, iron, tungsten, molybdenum, cobalt, titanium, zirconium, manganese, chromium, vanadium, niobium, as well as tin, bismuth, and antimony; noble metals including platinum group metals (PGMs), such as ruthenium, rhodium, palladium, indium, platinum, and precious metals such as gold and silver; alkaline earth metals such as beryllium, magnesium, calcium, strontium, and barium; and rare earth metals such as lanthanum, cerium, praseodymium, neodymium, europium, terbium, erbium, ytterbium, and yttrium. Preferred transition metals for post-synthesis exchange are base metals, and preferred base metals include those selected from the group consisting of manganese, iron, cobalt, nickel, copper, noble metals including platinum group metals (PGMs) and mixtures thereof.

The transition metal can be present in an amount of about 0.1 to about 10 weight percent, for example about 0.1 to about 5 weigh percent, about 0.1 to about 1.0 weight percent, about 2.5 to about 3.5 weight percent, and about 4.5 to about 5.5 weight percent, wherein the weight percent is relative to the total weight of the zeolite material, and the endpoints can be included.

Particularly preferred exchanged metals include copper and iron, particularly when combined with calcium and/or cerium and particularly when the transition metals ($T_M$) and the alkaline metals ($A_M$) are present in a $T_M$:$A_M$ molar ratio of about 15:1 to about 1:1, for example about 10:1 to about 2:1, about 10:1 to about 3:1, or about 6:1 to about 4:1, where the endpoints can be included.

Metals incorporated post-synthesis can be added to the molecular sieve via any known technique such as ion exchange, impregnation, isomorphous substitution, etc.

These exchanged metal cations are distinct from metals constituting the molecular framework of the zeolite, and thus metal exchanged zeolites are distinct from metal-substituted zeolites.

In a second aspect of the invention, provided are: (1) SAPO-56AP containing trimethylamine and 1,4-(1,4-diaz-abicyclo[2.2.2]octane)butyl cations within the SAPO-56 structure; and (2) SAPO-56AP containing trimethylamine and 1,5-(1,4-diazabicyclo[2.2.2] octane)pentyl cations, within the SAPO-56 structure.

The structure of molecular sieves having a SAPO-56 structure and comprising trimethylamine and 1,4-(1,4-diaz-abicyclo[2.2.2]octane)butyl cations was determined by x-ray analysis. The x-ray patterns presented in the following examples were obtained using standard x-ray powder diffraction techniques. The X-ray powder diffraction data was obtained with a Panalytical Empyrean automated diffractometer equipped with a X'Celerator detector. Measurements were made with automatic slit divergence. The data were collected in Bragg-Brentano geometry, using Cu K$\alpha_1$ X-radiation from an X-ray tube operating at 45 KV and 35 mA. The radiation was monochromatised. Step scanned data were collected between 5 and 50 degrees 2theta with step size 0.01°, time step$^{-1}$ 160 s, rad soller 0.04, 45 kV, 35 mA. The collected data were analysed with DIFFRAC.SUITE EVA Bruker software. The X-ray computer intensities given herein are based on peak height.

The relative intensities, 100 I/I$_0$, where I$_0$ is the intensity of the strongest line or peak, and d, the interplanar spacing in Angstroms corresponding to the recorded lines, were calculated. Minor variations in the diffraction patterns of the various materials as provided in the Tables or Figures can result from variations in the organic compound used in the preparation from variations in the Si, Al and P mole ratios from sample to sample and water content within the framework structures. The preferred orientation of the crystallites within the sample older for PXRD can be another cause of variation of the relative intensity. Notwithstanding these minor perturbations, the basic crystal structures for the as-prepared condition and the calcined condition remain substantially unchanged.

As will be understood by those of skill in the art, the determination of the parameter 2θ is subject to both human and mechanical error, which in combination can impose an uncertainty of about ±0.4° on each reported value of 2θ. This uncertainty is, of course, also manifested in the reported values of the d-spacings, which are calculated from the 2θ values. This imprecision is general throughout the art and is not sufficient to preclude the differentiation of the present crystalline materials from each other and from the compositions of the prior art. In some of the x-ray patterns reported, the relative intensities of the d-spacings are indicated by the notations vs, s, m, and w which represent very strong, strong, medium, and weak, respectively. In terms of 100× I/I$_0$, the above designations are defined as: w (weak) <20; m (medium) is ≥20 and <40; s (strong) is ≥40 and <60; and vs (very strong) is ≥60. When the intensity is near the endpoint for a range, the intensity may be characterized was being in either of the ranges. For example, intensities of 18-22 may be listed as w-m. However, due to variations in intensity of the lines, as known in the art, one or more of the lines may have an intensity that is in an adjacent range.

Figure 1:
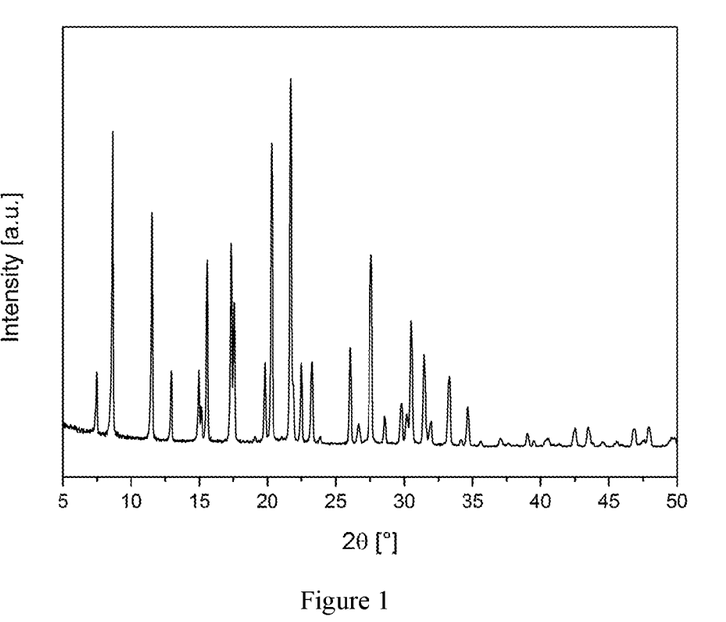
FIG. 1 is an XRD spectra of a sample of as-prepared SAPO-56 containing trimethylamine and 1,4-(1,4-diazabicyclo[2.2.2]octane)butyl cations, as prepared in Example 2.

The powder XRD of a SAPO-56 comprising trimethylamine and 1,4-(1,4-diazabicyclo[2.2.2] octane)butyl cations is shown in FIG. 1. The characteristic lines are shown in Table 1.

TABLE 1

Diffraction peaks of as prepared SAPO-56 containing trimethylamine and 1,4-(1,4-diazabicyclo[2.2.2]octane)butyl cations.

| d-spacing [Å] | 2θ [°]$^a$ | Rel. Int. [%] |
|---|---|---|
| 11.81 | 7.5 | w |
| 10.20 | 8.7 | vs |
| 7.67 | 11.5 | s-vs |
| 6.84 | 13.0 | m |
| 5.92 | 15.0 | w |
| 5.68 | 15.6 | s |
| 5.11 | 17.4 | s |
| 5.04 | 17.6 | m |
| 4.48 | 19.8 | m |
| 4.37 | 20.3 | vs |
| 4.10 | 21.7 | vs |
| 4.06 | 21.9 | w |
| 3.95 | 22.5 | m |
| 3.82 | 23.3 | w |
| 3.42 | 26.0 | m |
| 3.35 | 26.6 | w |
| 3.23 | 27.6 | s |
| 3.13 | 28.5 | w |
| 2.99 | 29.8 | w |
| 2.96 | 30.1 | w |
| 2.93 | 30.5 | m |
| 2.84 | 31.4 | m |
| 2.80 | 32.0 | w |
| 2.69 | 33.2 | w |
| 2.68 | 33.4 | w |
| 2.59 | 34.7 | w |

$^a$= ±0.2
The relative intensity is based on the strongest line in the X-ray pattern, which is assigned a value of 100. W (weak) is less than 20; M (medium) is ≥20 and <40; S (strong) is ≥40 and <60; and VS (very strong) is ≥60.

Molecular sieves having a SAPO-56 structure comprising trimethylamine and 1,4-(1,4-diazabicyclo[2.2.2]octane)butyl cations can have at least one property selected from the group consisting of: a characteristic X-ray powder diffraction pattern substantially similar to that shown in FIG. 1; and a characteristic X-ray powder diffraction pattern comprising 2-theta positions at 8.7 (vs), 11.5 (vs), 15.6 (s), 17.4 (s), 20.3 (vs), 21.7 (vs) and 27.65 (s) ±0.2 with the corresponding relative intensity shown in parenthesis, where the corresponding relative intensities are w (weak) <20; m (medium) is ≥20 and <40; s (strong) is ≥40 and <60; and vs (very strong) is ≥60.

The characteristic X-ray powder diffraction pattern can further comprise a characteristic X-ray powder diffraction pattern comprising one or more lines, preferably two or more lines, more preferably three or more lines, even more preferably four or more lines at 2-theta positions at 13.0 (m), 17.6 (m), 19.8 (m), 22.5 (m), 26.0 (m), 30.5 (m), and 31.4 (m) 0.2 with the corresponding relative intensity shown in parenthesis.

The characteristic X-ray powder diffraction pattern can further comprise a characteristic X-ray powder diffraction pattern comprising one or more lines, preferably two or more lines, more preferably three or more lines, even more preferably four or more lines at 2-theta positions at 7.5 (w), 15.0 (w), 21.9 (w), 23.3 (w), 26.6 (w), 28.5 (w), 29.8 (w), 30.1 (w), 32.0 (w), 33.2 (w), 33.4 (w) and 34.7 (w) ±0.2 with the corresponding relative intensity shown in parenthesis.

The structure of molecular sieves having a SAPO-56 structure and comprising trimethylamine and 1,5-(1,4-diazabicyclo[2.2.2]octane)pentyl cations was determined by x-ray analysis. The powder XRD of a SAPO-56 comprising trimethylamine and 1,4-(1,4-diazabicyclo[2.2.2] octane) pentyl cations was determined as described above and is shown in FIG. 3. The characteristic lines are shown in Table 2.

TABLE 2

Diffraction peaks of as prepared SAPO-56 containing trimethylamine and 1,5-(1,4-diazabicyclo[2.2.2]octane)pentyl cations.

| d-spacing [Å] | 2θ [°]$^a$ | Rel. Int. [%] |
| --- | --- | --- |
| 11.88 | 7.4 | w |
| 10.24 | 8.6 | vs |
| 7.70 | 11.5 | vs |
| 6.85 | 12.9 | m |
| 5.93 | 14.9 | w |
| 5.69 | 15.6 | m |
| 5.12 | 17.3 | s |
| 5.06 | 17.5 | s |
| 4.49 | 19.8 | w |
| 4.37 | 20.3 | s |
| 4.10 | 21.7 | vs |
| 4.07 | 21.8 | m |
| 3.95 | 22.5 | w |
| 3.83 | 23.2 | m |
| 3.42 | 26.1 | m |
| 3.35 | 26.6 | w |
| 3.24 | 27.5 | vs |
| 3.12 | 28.6 | w |
| 3.00 | 29.7 | w |
| 2.97 | 30.2 | w |
| 2.93 | 30.5 | m |
| 2.84 | 31.5 | m |
| 2.81 | 31.9 | w |
| 2.69 | 33.2 | m |
| 2.68 | 33.4 | w |
| 2.59 | 34.6 | w |

$^a$= ±0.2

The relative intensities are as described above.

Figure 3:
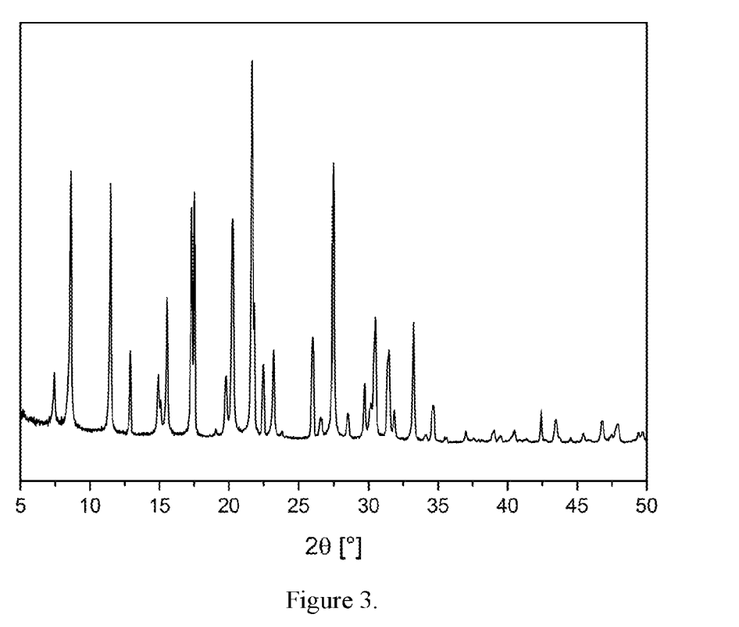
FIG. 3 is an XRD spectra of a sample of as-prepared SAPO-56 containing trimethylamine and 1,5-(1,4-diazabicyclo[2.2.2]octane)pentyl cations, as prepared in Example 4.

A novel zeolite having a SAPO-56 structure comprising trimethylamine and 1,5-(1,4-diazabicyclo[2.2.2]octane)pentyl cations can have at least one property selected from the group consisting of: a characteristic X-ray powder diffraction pattern substantially similar to that shown in FIG. 3; and a characteristic X-ray powder diffraction pattern comprising 2-theta positions at 8.6 (vs), 11.5 (vs), 17.3 (s), 17.5 (s), 20.3 (s). 21.7 (vs) and 27.5 (vs) ±0.2 with the corresponding relative intensity shown in parenthesis, where the corresponding relative intensities are w (weak) <20; m (medium) is ≥20 and <40; s (strong) is ≥40 and <60; and vs (very strong) is ≥60.

The characteristic X-ray powder diffraction pattern can further comprise a characteristic X-ray powder diffraction pattern comprising one or more lines, preferably two or more lines, more preferably three or more lines, even more preferably four or more lines at 2-theta positions at 12.9 (m), 15.6 (m), 21.8 (m), 23.2 (m), 26.1 (m), 30.5 (m), 31.5 (m) and 33.2 (m)±0.2 with the corresponding relative intensity shown in parenthesis.

The characteristic X-ray powder diffraction pattern can further comprise a characteristic X-ray powder diffraction pattern comprising one or more lines, preferably two or more lines, more preferably three or more lines, even more preferably four or more lines at 2-theta positions at 7.4 (w), 14.9 (w), 19.8 (w), 22.5 (w), 26.6 (w), 28.6 (w-m), 29.7 (w), 30.2 (w), 31.9 (w), 33.4 (w) and 34.6 (w) ±0.2 with the corresponding relative intensity shown in parenthesis.

In a third aspect of the invention, provided are compositions prepared for manufacturing SAPO-56. The composition comprises a silica component, a phosphorus component, an aluminum component, structure directing agents (SDAs) and a lower alkyl ammonia hydroxide. These components can be present in a mixture described by the general formula as follows:

A SiO$_2$:1Al(OH)$_3$:BH$_3$PO$_4$:CH$_2$O:D diDABCO-C4 or diDABCO-C5:E trimethylamine:F tetrabutylammonium hydroxide The molar ratio of silica to aluminum hydroxide can be in the range of from about 0.01 to about 0.50, preferably from about 0.25 to about 0.45, more preferably from about 0.29 to about 0.4, where the endpoints can be included.

The molar ratio of aluminum hydroxide to H$_3$PO$_4$ can be in the range of from about 0.5 to about 0.99, preferably from about 0.55 to about 0.75, more preferably from about 0.6 to about 0.71, where the endpoints can be included.

The molar ratio of aluminum hydroxide to water can be in the range of from about 10 to about 100, preferably from about 30 to about 60, more preferably about 35 to about 45, where the endpoints can be included.

The molar ratio of aluminum hydroxide to diDABCO-C4 or diDABCO-C5 can be in the range of from about 0.05 to about 0.30, preferably from about 0.10 to about 0.15, where the endpoints can be included.

The molar ratio of aluminum hydroxide to trimethylamine can be in the range of from about 0.05 to about 0.5, preferably from about 0.1 to about 0.3, more preferably about 0.15 to 0.25, where the endpoints can be included.

The molar ratio of aluminum hydroxide to tetrabutylammonium hydroxide can be in the range of from about 0.05 to about 0.5, preferably from about 0.15 to about 0.35, more preferably from about 0.15 to about 0.25, where the endpoints can be included.

It is preferable that the pH value of the final reaction mixture be in the range from about 5.5 to about 8.5, preferably from about 6.5 to about 7.5, more preferably, about 7.0, where the endpoints can be included. The pH value of a mixture can be adjusted, if desired, by adding an appropriate amount of a base such as tetrabutylammonium hydroxide.

In a fourth aspect of the invention, provided are catalytic compositions comprising SAPO-56 prepared of the first aspect of the invention. SAPO-56 is useful as a catalyst in certain applications. SAPO-56 can be used either without a post-synthesis metal exchange or with a post-synthesis metal exchange, preferably with a post-synthesis metal exchange. Thus, in certain aspects of the invention, provided is a catalyst comprising SAPO-56 that is free or essentially free of any exchanged metal, particularly post-synthesis exchanged or impregnated metals. SAPO-56 preferably can comprise one or more catalytic metal ions exchanged or otherwise impregnated into the channels and/or cavities of the zeolite. Examples of metals that can be post-zeolite synthesis exchanged or impregnated include transition metals, including copper, nickel, zinc, iron, tungsten, molybdenum, cobalt, titanium, zirconium, manganese, chromium, vanadium, niobium, as well as tin, bismuth, and antimony; noble metals including platinum group metals (PGMs), such as ruthenium, rhodium, palladium, indium, platinum, and precious metals such as gold and silver; alkaline earth metals such as beryllium, magnesium, calcium, strontium, and barium; and rare earth metals such as lanthanum, cerium, praseodymium, neodymium, europium, terbium, erbium, ytterbium, and yttrium. Preferred transition metals for post-synthesis exchange are base metals, and preferred base metals include those selected from the group consisting of manganese, iron, cobalt, nickel, copper, noble metals including platinum group metals (PGMs) and mixtures thereof.

The transition metal can be present in an amount of about 0.1 to about 10 weight percent, for example about 0.1 to about 5 weigh percent, about 0.1 to about 1.0 weight percent, about 2.5 to about 3.5 weight percent, and about 4.5 to about 5.5 weight percent, wherein the weight percent is relative to the total weight of the zeolite material, and the endpoints can be included.

Particularly preferred exchanged metals include copper and iron, particularly when combined with calcium and/or cerium and particularly when the transition metals ($T_M$) and the alkaline metals ($A_M$) are present in a $T_M:A_M$ molar ratio of about 15:1 to about 1:1, for example about 10:1 to about 2:1, about 10:1 to about 3:1, or about 6:1 to about 4:1, where the endpoints can be included Metals incorporated post-synthesis can be added to the molecular sieve via any known technique such as ion exchange, impregnation, isomorphous substitution, etc.

These exchanged metal cations are distinct from metals constituting the molecular framework of the zeolite, and thus metal exchanged zeolites are distinct from metal-substituted zeolites.

Catalysts of the present invention are particularly applicable for heterogeneous catalytic reaction systems (i.e., solid catalyst in contact with a gas reactant). To improve contact surface area, mechanical stability, and/or fluid flow characteristics, the catalysts can be disposed on and/or within a substrate, preferably a porous substrate. A washcoat containing the catalyst can be applied to an inert substrate, such as corrugated metal plate or a honeycomb cordierite brick. Alternatively, the catalyst can be kneaded along with other components such as fillers, binders, and reinforcing agents, into an extrudable paste which can then be extruded through a die to form a honeycomb brick or extruded body such as a cylinder, trilobe or quadralobe. The catalyst can also be in the form of a micro-spherical particle (10-150 microns in diameter) containing the SAPO-56 of the present invention together with fillers, binders and/or reinforcing agents. The micro-spherical particle can be prepared by spray drying or other suitable techniques. A catalyst article can comprise a SAPO-56 catalyst described herein coated on and/or incorporated into a substrate.

Certain aspects of the invention provide a catalytic washcoat. The washcoat comprising SAPO-56 described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-zeolite silica alumina, titanic, zirconia, ceria. Where the catalyst is part of a washcoat composition, the washcoat can further comprise a binder containing Ce or ceria. When the binder contains Ce or ceria, the Ce containing particles in the binder are significantly larger than the Ce containing particles in the catalyst. The catalyst composition can comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. The washcoat loading on, or in, the substrate can be between about 0.3 g/in$^3$ to about 3.5 g/in$^3$, where the endpoints can be included. The loading can be a function of the type of substrate used and the backpressure that results from the loading on a specific type of substrate. The lower limit for the washcoat loading can be 0.5 g/in$^3$, 0.8 g/in$^3$, 1.0 g/in$^3$, 1.25 g/in$^3$, or 1.5 g/in$^3$. The upper limit for the washcoat loading can be 3.5 g/in$^3$, 3.25 g/in$^3$, 3.0 g/in$^3$, 2.75 g/in$^3$, 2.5 g/in$^3$, 2.25 g/in$^3$, 2.0 g/in$^3$, 1.75 g/in$^3$ or 1.5 g/in$^3$.

Two of the most common substrate designs to which catalyst can be applied are plate and honeycomb. Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as Al$_2$OsZFe, Al$_2$O$_3$/Ni or B$_4$CZFe, or composites comprising segments of any two or more thereof. Preferred materials include cordierite, silicon carbide, and alumina titanate.

Plate-type catalysts have lower pressure drops and are less susceptible to plugging and fouling than the honeycomb types, which can be advantageous in high efficiency stationary applications, but plate configurations can be much larger and more expensive. A honeycomb configuration is typically smaller than a plate type, which can be an advantage in mobile applications, but has higher pressure drops and plug more easily. The plate substrate can be constructed of metal, preferably corrugated metal.

A catalyst article can be made by a process described herein. The catalyst article can be produced by a process that includes the steps of applying a metal containing SAPO-56, preferably as a washcoat, to a substrate as a layer either before or after at least one additional layer of another composition for treating exhaust gas has been applied to the substrate. The one or more catalyst layers on the substrate, including the layer comprising SAPO-56, are arranged in consecutive layers. As used herein, the term "consecutive" with respect to catalyst layers on a substrate means that each layer is contact with its adjacent layer(s) and that the catalyst layers as a whole are arranged one on top of another on the substrate.

The SAPO-56 catalyst can be disposed on the substrate as a first layer or zone and another composition, such as an oxidation catalyst, reduction catalyst, scavenging component, or $NO_x$ storage component, can be disposed on the substrate as a second layer or zone. As used herein, the terms "first layer" and "second layer" are used to describe the relative positions of catalyst layers in the catalyst article with respect to the normal direction of exhaust gas flow-through, past, and/or over the catalyst article. Under normal exhaust gas flow conditions, exhaust gas contacts the first layer prior to contacting the second layer. The second layer can be applied to an inert substrate as a bottom layer and the first layer is a top layer that is applied over the second layer as a consecutive series of sub-layers.

The exhaust gas can penetrate (and hence contact) the first layer, before contacting the second layer, and subsequently returns through the first layer to exit the catalyst component.

The first layer can be a first zone disposed on an upstream portion of the substrate and the second layer is disposed on the substrate as a second zone, wherein the second zone is downstream of the first.

The catalyst article can be produced by a process that includes the steps of applying SAPO-56, preferably as a washcoat, to a substrate as a first zone, and subsequently applying at least one additional composition for treating an exhaust gas to the substrate as a second zone, wherein at least a portion of the first zone is downstream of the second zone. Alternatively, a composition comprising SAPO-56 can be applied to the substrate in a second zone that is downstream of a first zone containing the additional composition. Examples of additional compositions include oxidation catalysts, reduction catalysts, scavenging components (e.g., for sulfur, water, etc.), or $NO_x$ storage components.

To reduce the amount of space required for an exhaust system, individual exhaust components can be designed to perform more than one function. For example, applying an SCR catalyst to a wall-flow filter substrate instead of a flow-through substrate serves to reduce the overall size of an exhaust treatment system by allowing one substrate to serve two functions, namely catalytically reducing $NO_x$ concentration in the exhaust gas and mechanically removing soot from the exhaust gas. The substrate can be a honeycomb wall-flow filter or partial filter. Wall-flow filters are similar to flow-through honeycomb substrates in that they contain a plurality of adjacent, parallel channels. However, the channels of flow-through honeycomb substrates are open at both ends, whereas the channels of wall-flow substrates have one end capped, wherein the capping occurs on opposite ends of adjacent channels in an alternating pattern. Capping alternating ends of channels prevents the gas entering the inlet face of the substrate from flowing straight through the channel and existing. Instead, the exhaust gas enters the front of the substrate and travels into about half of the channels where it is forced through the channel walls prior to entering the second half of the channels and exiting the back face of the substrate.

The substrate wall has a porosity and pore size that is gas permeable, but traps a major portion of the particulate matter, such as soot, from the gas as the gas passes through the wall. Preferred wall-flow substrates are high efficiency filters. Wall flow filters for use with the present invention preferably have an efficiency of ≥70%, ≥about 75%, ≥about 80%, or ≥about 90%. The efficiency can be from about 75 to about 99%, about 75 to about 90%, about 80 to about 90%, or about 85 to about 95%. Here, efficiency is relative to soot and other similarly sized particles and to particulate concentrations typically found in conventional diesel exhaust gas. For example, particulates in diesel exhaust can range in size from 0.05 microns to 2.5 microns. Thus, the efficiency can be based on this range or a sub-range, such as 0.1 to 0.25 microns, 0.25 to 1.25 microns, or 1.25 to 2.5 microns.

Porosity is a measure of the percentage of void space in a porous substrate and is related to backpressure in an exhaust system: generally, the lower the porosity, the higher the backpressure. Preferably, the porous substrate has a porosity of about 30 to about 80%, for example about 40 to about 75%, about 40 to about 65%, or from about 50 to about 60%, where the endpoints can be included.

The pore interconnectivity, measured as a percentage of the substrate's total void volume, is the degree to which pores, void, and/or channels, are joined to form continuous paths through a porous substrate, i.e., from the inlet face to the outlet face. In contrast to pore interconnectivity is the sum of closed pore volume and the volume of pores that have a conduit to only one of the surfaces of the substrate. Preferably, the porous substrate has a pore interconnectivity volume of ≥about 30%, more preferably ≥about 40%.

The mean pore size of the porous substrate is also important for filtration. Mean pore size can be determined by any acceptable means, including by mercury porosimetry. The mean pore size of the porous substrate should be of a high enough value to promote low backpressure, while providing an adequate efficiency by either the substrate per se, by promotion of a soot cake layer on the surface of the substrate, or combination of both. Preferred porous substrates have a mean pore size of about 10 to about 40 μm, for example about 20 to about 30 μm, about 10 to about 25 μm, about 10 to about 20 μm, about 20 to about 25 μm, about 10 to about 15 μm, and about 15 to about 20 μm.

In general, the production of an extruded solid body, such as honeycomb flow-through or wall-flow filter, containing SAPO-56 involves blending SAPO-56, a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. SAPO-56 can also be washcoated or otherwise applied to the extruded solid body as one or more sub-layers that reside on the surface or penetrate wholly or partly into the extruded solid body.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Preferably, SAPO-56 is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume and pore radius can be measured e.g. using mercury intrusion porosimetry.

EXAMPLES

The following examples demonstrate but do not limit the present invention.

Example 1. Synthesis of 1,5-(1,4-diazabicyclo [2.2.2]octane)pentyl dibromide (diDABCO-C5), a Structure-Directing Agent 13.0 g (0.06 mol) of 1,5-dibromopentane was dissolved in 50 mL ethanol and added drop-wise with stirring to a solution at 50° C. of 33.6 g (0.30 mol) of 1,4-diazabicyclo [2.2.2] octane (DABCO) dissolved in 100 mL ethanol. The mixture was refluxed for 24 hours, then cooled. Excess ethanol was removed on a rotary evaporator leaving yellow oil. Subsequently cold diethyl ether was added to the oil to precipitate a white solid that was washed with cold acetone and acetonitrile and dried at 50° C. overnight. The reaction yielded 20.27 g (yield 79%) of product which was analysed by NMR and elemental analysis.

Example 2. Synthesis of SAPO-56 Using Trimethylamine and diDABCO-C4

A reaction gel having a molar composition:

0.29 SiO$_2$:1 Al(OH)$_3$:0.71 H$_3$PO$_4$:40 H$_2$O:0.10 diD-ABCO-C4:0.21 trimethylamine:0.23 tetrabutylammonium hydroxide was prepared in a 30 mL pressure vessel. The reagents used and order of addition was:
a) The required amount of phosphoric acid (H$_3$PO$_4$ 85 wt. %, BDH) was weighted into a Teflon lined vessel.
b) The required amount of silica (fumed silica powder 0.007 μm, Sigma Aldrich) and water were added to the phosphoric acid and the mixture was stirred.
c) The required amount of aluminium hydroxide (Al(OH)$_3$, Sigma Aldrich) was added to the above mixture.
d) After stirring for 30 minutes, diDABCO-C4 (Valiant) was added to the mixture.
e) Trimethylamine (45 wt. %, Sigma Aldrich) was added to the above mixture and the mixture was stirred for 10 minutes.
f) Tetrabutylammonium hydroxide (40 wt. %, Sigma Aldrich) was then added to the mixture to maintain the pH at 7.

The final gel was stirred continuously at room temperature for at least 2 hours during the preparation procedure, until homogeneous, prior to being transferred to a Teflon-lined stainless steel autoclave and heated in static condition at 190° C. for 4 days. The resultant product was collected by filtration, washed with deionised H$_2$O, and dried in air at 80° C. for 12 hours.

The powder XRD pattern is shown in FIG. 1 and comprises the diffraction peaks in Table 3. Analysis by powder XRD indicated that the product was phase pure SAPO-56.

TABLE 3

Diffraction peaks of as prepared material of Example 2

| d-spacing [Å] | 2θ [°] | Rel. Int. [%] |
|---|---|---|
| 11.81 | 7.5 | 19 |
| 10.20 | 8.7 | 85 |
| 7.67 | 11.5 | 62 |
| 6.84 | 13.0 | 20 |
| 5.92 | 15.0 | 19 |
| 5.68 | 15.6 | 51 |
| 5.11 | 17.4 | 55 |
| 5.04 | 17.6 | 37 |
| 4.48 | 19.8 | 23 |
| 4.37 | 20.3 | 82 |
| 4.10 | 21.7 | 100 |
| 4.06 | 21.9 | 15 |
| 3.95 | 22.5 | 22 |
| 3.82 | 23.3 | 19 |
| 3.42 | 26.0 | 27 |
| 3.35 | 26.6 | 6 |
| 3.23 | 27.6 | 46 |
| 3.13 | 28.5 | 8 |
| 2.99 | 29.8 | 10 |
| 2.96 | 30.1 | 8 |
| 2.93 | 30.5 | 34 |
| 2.84 | 31.4 | 24 |
| 2.80 | 32.0 | 6 |
| 2.69 | 33.2 | 16 |
| 2.68 | 33.4 | 16 |
| 2.59 | 34.7 | 11 |

Example 3. Activation of SAPO-56 of Example 2

Figure 2:
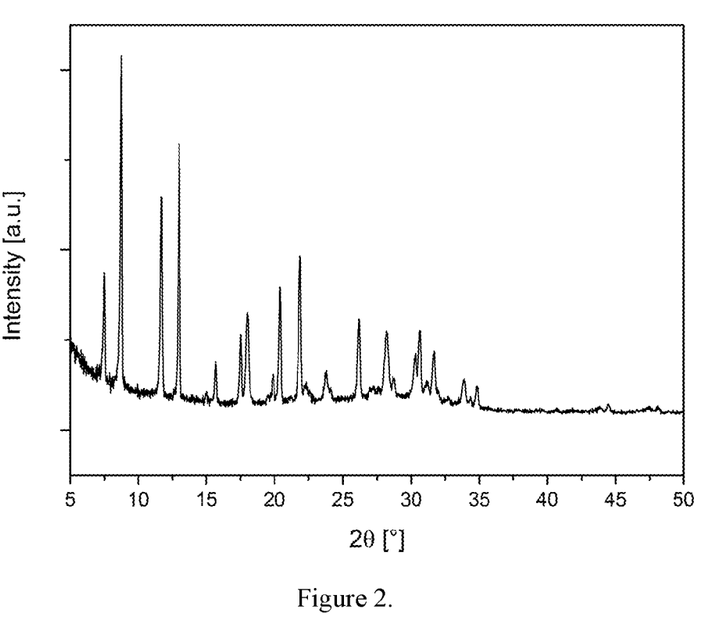
FIG. 2 is an XRD spectra of a sample of activated (calcined) SAPO-56 formed from SAPO-56 containing trimethylamine and 1,4-(1,4-diazabicyclo[2.2.2]octane)butyl cations, as prepared in Example 3.

A portion of the as-made material from Example 2 was activated by calcination in dry oxygen. The material was heated at 600° C. and held at that temperature for 12 hours. The PXRD pattern of the activated product and the list of diffraction peaks are shown in FIG. 2 and Table 4, respectively.

TABLE 4

Diffraction peaks of calcined material of Example 3.

| d-spacing [Å] | 2θ [°] | Rel. Int. [%] |
|---|---|---|
| 11.79 | 7.5 | 33 |
| 10.10 | 8.8 | 100 |
| 7.55 | 11.7 | 64 |
| 6.80 | 13.0 | 82 |
| 5.65 | 15.7 | 12 |
| 5.06 | 17.5 | 22 |
| 4.94 | 18.0 | 28 |
| 4.46 | 19.9 | 10 |
| 4.35 | 20.4 | 37 |
| 4.06 | 21.9 | 46 |
| 3.74 | 23.8 | 10 |
| 3.40 | 26.2 | 28 |
| 3.16 | 28.2 | 24 |
| 2.95 | 30.3 | 18 |
| 2.91 | 30.7 | 22 |
| 2.82 | 31.7 | 18 |
| 2.64 | 33.9 | 9 |
| 2.57 | 34.9 | 7 |

Example 4. Synthesis of SAPO-56 Using Trimethylamine and diDABCO-C5

A reaction gel having a molar composition:

0.29 $SiO_2$:1 $Al(OH)_3$:0.71 $H_3PO_4$:40 $H_2O$:0.10 diDABCO-C5:0.21 trimethylamine:0.23 tetrabutylammonium hydroxide, with 4 wt % AFX (seed)

was prepared in a 30 mL pressure vessel. The reagents used and order of addition was:
a) The required amount of phosphoric acid ($H_3PO_4$ 85 wt. %, BDH) was weighted into a Teflon lined vessel.
b) The required amount of silica (fumed silica powder 0.007 μm, Sigma Aldrich) and water were added to the phosphoric acid and stirred.
c) The required amount of aluminium hydroxide ($Al(OH)_3$, Sigma Aldrich) was added to the above mixture.
d) After stirring for 30 minutes, diDABCO-C5 was added.
e) Trimethylamine (45 wt. %, Sigma Aldrich) was added over the above solution and the mixture was stirred for 10 minutes.
f) Tetrabutylammonium hydroxide (40 wt. %, Sigma Aldrich) was then added to the mixture to maintain the pH at 7.
g) 4 wt. % of SAPO-AFX seeds were finally added.

The final gel was stirred continuously at room temperature for at least 2 hours during the preparation procedure, until homogeneous, prior to being transferred to a Teflon-lined stainless steel autoclave and heated in static condition at 190° C. for 4 days. The resultant product was collected by filtration, washed with deionised $H_2O$, and dried in air at 80° C. for 12 hours.

The powder XRD pattern is shown in FIG. 3 and comprises the diffraction peaks in Table 5. Analysis by powder XRD indicated that the product was phase pure SAPO-56.

TABLE 5

Diffraction peaks of as prepared material of Example 4.

| d-spacing [Å] | 2θ [°] | Rel. Int. [%] |
|---|---|---|
| 11.88 | 7.4 | 15 |
| 10.24 | 8.6 | 70 |
| 7.70 | 11.5 | 68 |
| 6.85 | 12.9 | 22 |
| 5.93 | 14.9 | 15 |
| 5.69 | 15.6 | 35 |
| 5.12 | 17.3 | 62 |
| 5.06 | 17.5 | 66 |
| 4.49 | 19.8 | 20 |
| 4.37 | 20.3 | 55 |
| 4.10 | 21.7 | 100 |
| 4.07 | 21.8 | 36 |
| 3.95 | 22.5 | 19 |
| 3.83 | 23.2 | 19 |
| 3.42 | 26.1 | 25 |
| 3.35 | 26.6 | 6 |
| 3.24 | 27.5 | 74 |
| 3.12 | 28.6 | 7 |
| 3.00 | 29.7 | 15 |
| 2.97 | 30.2 | 10 |
| 2.93 | 30.5 | 33 |
| 2.84 | 31.5 | 23 |
| 2.81 | 31.9 | 8 |
| 2.69 | 33.2 | 33 |
| 2.68 | 33.4 | 17 |
| 2.59 | 34.6 | 9 |

Example 5. Activation of SAPO-56 of Example 4

A portion of the as-made material from Example 4 was activated by calcination in dry oxygen. The material was heated at 600° C. and held at that temperature for 12 hours.

Figure 4:
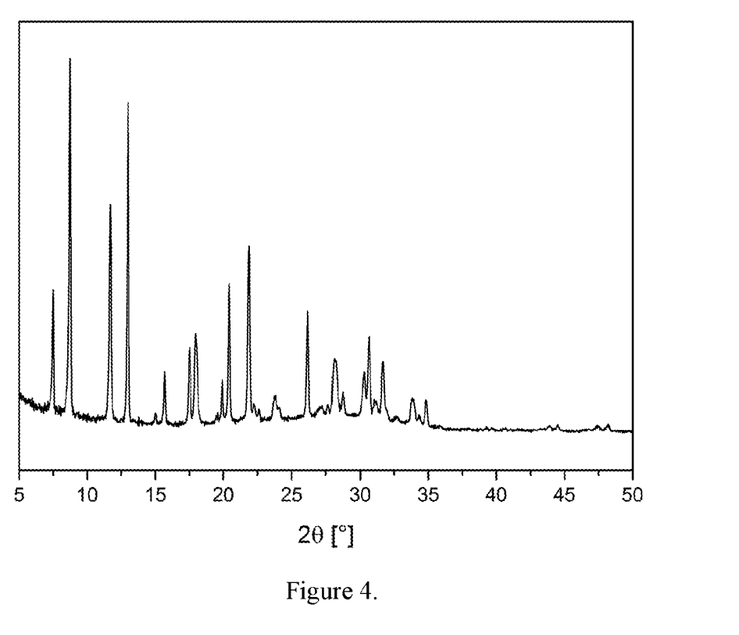
FIG. 4 is an XRD spectra of a sample of activated (calcined) SAPO-56 formed from SAPO-56 containing trimethylamine and 1,5-(1,4-diazabicyclo[2.2.2]octane)pentyl cations, as prepared in Example 5.

The PXRD pattern of the activated product and the list of diffraction peaks are shown in FIG. 4 and Table 6, respectively.

TABLE 6

Diffraction peaks of calcined material of Example 5.

| d-spacing [Å] | 2θ [°] | Rel. Int. [%] |
|---|---|---|
| 11.80 | 7.5 | 35 |
| 10.12 | 8.7 | 100 |
| 7.56 | 11.7 | 61 |
| 6.81 | 13.0 | 89 |
| 5.65 | 15.7 | 14 |
| 5.06 | 17.5 | 21 |
| 4.94 | 17.9 | 23 |
| 4.46 | 19.9 | 11 |
| 4.35 | 20.4 | 38 |
| 4.06 | 21.9 | 46 |
| 3.74 | 23.8 | 6 |
| 3.40 | 26.2 | 29 |
| 3.18 | 28.0 | 21 |
| 2.95 | 30.3 | 12 |
| 2.91 | 30.7 | 22 |
| 2.82 | 31.7 | 16 |
| 2.65 | 33.8 | 7 |
| 2.57 | 34.9 | 7 |

Example 6. Synthesis of SAPO-56 (Trimethylamine and diDABCO-C4) in Stirring Oven A reaction gel having a molar composition:

0.4 $SiO_2$:1 $Al(OH)_3$:0.6 $H_3PO_4$:40 $H_2O$:0.15 diDABCO-C4:0.21 trimethylamine:0.16 tetrabutylammonium hydroxide was prepared in 125 mL pressure vessel. The reagents used and order of addition was:
a) The required amount of phosphoric acid ($H_3PO_4$ 85 wt. %, Alfa Chemicals) was weighted into the vessel.
b) The required amount of Ludox PX30 (30% w/w colloidal silica; Grace Davison) and water were added to the phosphoric acid and stirred.
c) The required amount of aluminium hydroxide ($Al(OH)_3$, Sigma Aldrich) was added to the above mixture.
d) After stirring for 30 minutes, diDABCO-C4 (Valiant) was added.
e) Trimethylamine (45 wt. %, Sigma Aldrich) was added over the above solution and the mixture was stirred for 10 minutes.
f) Tetrabutylammonium hydroxide (40 wt. %, Sigma Aldrich) was then added to the mixture to maintain the pH at 7.

The final gel was stirred continuously at room temperature for at least 2 hours during the preparation procedure, until homogeneous, prior to being transferred to a Teflon-lined stainless steel autoclave and heated in a rotating oven (30 rpm) at 190° C. for 24 hours. The contents of the bomb were centrifuged and washed with de-mineralised water. The resulting product was dried overnight at 110° C.

Figure 5:
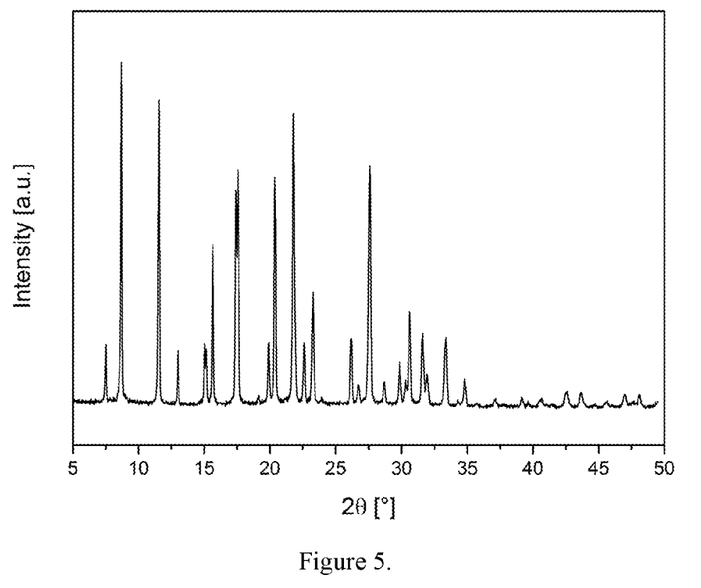
FIG. 5 is an XRD spectra of a sample of as-prepared SAPO-56 containing trimethylamine and 1,4-(1,4-diazabicyclo[2.2.2]octane)butyl cations, as prepared in Example 6.

The powder XRD pattern is shown in FIG. 5 and comprises the diffraction peaks in Table 7. Analysis by powder XRD indicated that the product was phase pure SAPO-56.

TABLE 7

Diffraction peaks of as prepared material of Example 6.

| d-spacing [Å] | 2θ [°] | Rel. Int. [%] |
|---|---|---|
| 11.76 | 7.5 | 17 |
| 10.16 | 8.7 | 100 |
| 7.66 | 11.6 | 89 |
| 6.80 | 13.0 | 20 |
| 5.90 | 15.0 | 18 |
| 5.66 | 15.7 | 47 |
| 5.09 | 17.4 | 62 |
| 5.04 | 17.6 | 68 |
| 4.46 | 19.9 | 18 |
| 4.35 | 20.4 | 67 |
| 4.08 | 21.8 | 85 |
| 4.06 | 21.9 | 15 |
| 3.94 | 22.6 | 18 |
| 3.82 | 23.3 | 19 |
| 3.41 | 26.2 | 20 |
| 3.34 | 26.7 | 6 |
| 3.23 | 27.6 | 59 |
| 3.12 | 28.7 | 7 |
| 2.99 | 29.9 | 12 |
| 2.95 | 30.3 | 7 |
| 2.93 | 30.5 | 34 |
| 2.83 | 31.6 | 20 |
| 2.80 | 32.0 | 9 |
| 2.69 | 33.4 | 18 |
| 2.68 | 33.4 | 16 |
| 2.58 | 34.8 | 6 |

Example 7. Activation of SAPO-56 of Example 6

The as-made material of Example 6 was activated by calcination in air. The material was heated to 110° C. at 2° C. min$^{-1}$ and held at 110° C. for 10 hours, then heated to 450° C. at 5° C./min$^{-1}$ and held at 450° C. for 16 hours. The material was then heated to 550° C. at 5° C. min$^{-1}$ at held at 550° C. for 16 hours.

Figure 6:
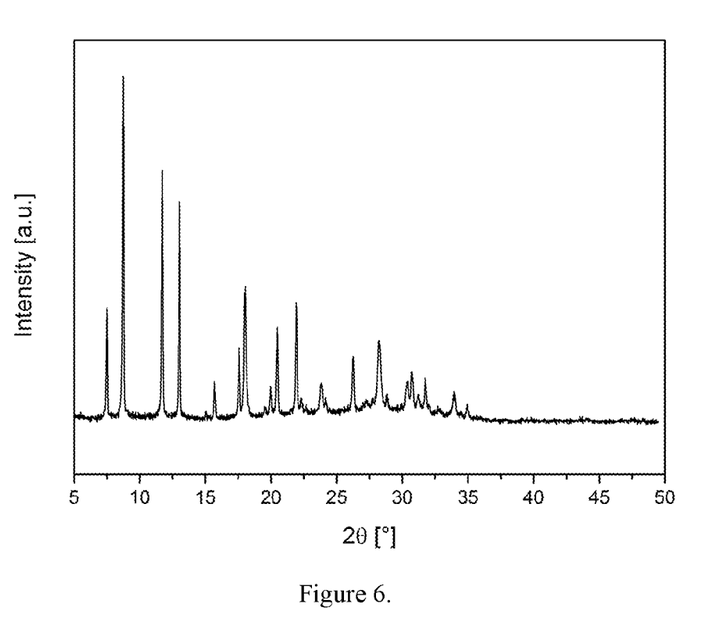
FIG. 6 is an XRD spectra of a sample of activated (calcined) SAPO-56 formed from SAPO-56 containing trimethylamine and 1,4-(1,4-diazabicyclo[2.2.2]octane)butyl cations, as prepared in Example 7.

The PXRD pattern of the activated product and the list of diffraction peaks are shown in FIG. 6 and Table 8, respectively.

TABLE 8

Diffraction peaks of calcined material of Example 7.

| d-spacing [Å] | 2θ [°] | Rel. Int. [%] |
|---|---|---|
| 11.66 | 7.6 | 30 |
| 10.01 | 8.8 | 100 |
| 7.50 | 11.8 | 74 |
| 6.74 | 13.1 | 62 |
| 5.69 | 15.8 | 8 |
| 5.05 | 17.7 | 19 |
| 4.89 | 18.1 | 40 |
| 4.41 | 20.1 | 8 |
| 4.31 | 20.6 | 24 |
| 4.02 | 22.0 | 41 |
| 3.72 | 23.9 | 8 |
| 3.38 | 26.4 | 24 |
| 3.15 | 28.3 | 20 |
| 2.93 | 30.5 | 8 |
| 2.90 | 30.8 | 21 |
| 2.80 | 31.9 | 10 |
| 2.63 | 34.0 | 6 |
| 2.56 | 35.0 | 5 |

What is claimed is:

1. A SAPO-56 comprising a lower alkyl amine and a template comprising either 1,4-(1,4-diazabicyclo[2.2.2]octane)butyl cations or 1,5-(1,4-diazabicyclo[2.2.2]octane)pentyl cations.

2. The SAPO-56 according to claim 1, where the lower alkyl amine is trimethylamine or N,N-dimethylethylamine.

3. The SAPO-56 according to claim 1, wherein the SAPO-56 has a characteristic X-ray powder diffraction pattern comprising 2-theta positions at 8.7 (vs), 11.5 (s-vs), 15.6 (s), 17.4 (s-vs), 20.3 (vs), 21.7 (vs) and 27.6 (s) ±0.2 with the corresponding relative intensity shown in parenthesis, where w (weak) represents a peak having a relative intensity of <20, m (medium) represents a peak having a relative intensity of ≥20 and <40, s (strong) represents a peak having a relative intensity of ≥40 and <60, and vs (very strong) represents a peak having a relative intensity of ≥60.

4. The SAPO-56 according to claim 1, where the template comprises 1,5-(1,4-diazabicyclo[2.2.2]octane)pentyl cations.

5. The SAPO-56 according to claim 4, wherein the SAPO-56 has a characteristic X-ray powder diffraction pattern comprising 2-theta positions at 8.6 (vs), 11.5 (vs), 17.3 (s), 17.5 (s), 20.3 (s), 21.7 (vs) and 27.5 (vs) ±0.2 with the corresponding relative intensity shown in parenthesis, where w (weak) represents a peak having a relative intensity of <20, m (medium) represents a peak having a relative intensity of >20 and <40, s (strong) represents a peak having a relative intensity of >40 and <60, and vs (very strong) represents a peak having a relative intensity of >60.

6. A method for synthesizing a SAPO-56, the method comprising:
 a. forming heating a reaction mixture comprising: (a) at least one source of alumina, (b) at least one source of silica, (c) a lower alkyl amine, (d) a compound comprising either 1,4-(1,4-diazabicyclo[2.2.2] octane)butyl cations or 1,5-(1,4-diazabicyclo[2.2.2]octane) pentyl cations, and (e) a lower alkyl ammonium hydroxide;
 b. forming molecular sieve crystals having a AFX framework and the structure directing agent, and
 c. recovering at least a portion of the molecular sieve crystals having an AFX framework from the reaction mixture.

7. The method according to claim 6, wherein the compound comprising either 1,4-(1,4-diazabicyclo[2.2.2]octane)butyl cations or 1,5-(1,4-diazabicyclo[2.2.2]octane) pentyl cations is associated with an anion selected from the group consisting of fluoride, chloride, bromide, iodide, hydroxide, acetate, sulfate, tetrafluoroborate, carboxylate, carbonate and bicarbonate.

8. The method according to claim 6, wherein the compound comprising either 1,4-(1,4-diazabicyclo[2.2.2]octane)butyl cations or 1,5-(1,4-diazabicyclo[2.2.2]octane) pentyl cations is associated with a bromide anion.

9. The method according to claim 6, where the compound comprising 1,4-(1,4-diazabicyclo[2.2.2] octane)butyl cations is 1,4-(1,4-diazabicyclo[2.2.2]octane)butyl dibromide (diDABCO-C4).

10. The method according to claim 6, where the compound comprising 1,5-(1,4-diazabicyclo[2.2.2]octane) pentyl cations is 1,5-(1,4-diazabicyclo[2.2.2]octane)pentyl dibromide (diDABCO-05).

11. The method according to claim 6, where the lower alkyl ammonium hydroxide comprises tetrabutylammonium hydroxide.

12. The method according to claim 6, wherein the reaction mixture is essentially free of fluoride.

13. The method according to claim 6, wherein the reaction mixture is a gel having a molar compositional ratio of:

| | |
|---|---|
| P/A | 0.5-0.99 |
| MeO$_2$/A | 0.02-1.0 |
| SDA1/A | 0.1-0.6 |
| SDA2/A | 0.1-0.6 |
| Lower alkyl ammonium hydroxide/A | 0.1-0.6 |
| H$_2$O/A | 20-200 | where P the source of phosphorous and is calculated as being in the oxide form (P$_2$O$_5$), A is Al, Fe, Cr, B, Ga or combinations thereof and is calculated as being in the oxide form (A$_2$O$_3$); and Me is Si, Ge, Mg or combinations thereof and is calculated as being in the oxide form (MO$_2$) and, where SDA1 comprises either 1,4-(1,4-diazabicyclo[2.2.2]octane)butyl cations or 1,5-(1,4-diazabicyclo[2.2.2]octane)pentyl cations and, where SDA2 comprises a lower alkyl amine.

14. The method according to claim 6, wherein the reaction mixture further comprises from about 0.1 to about 10% w/w of seed material, wherein the seed material comprises a crystalline molecular sieve having an AFX framework.

15. A composition comprising: (a) at least one source of alumina, (b) at least one source of silica, (c) a lower alkyl amine, (d) a compound comprising either 1,4-(1,4-diazabicyclo[2.2.2] octane)butyl cations or 1,5-(1,4-diazabicyclo[2.2.2]octane) pentyl cations, and (e) a lower alkyl ammonium hydroxide.

16. The composition of claim 15, wherein the compound comprising either 1,4-(1,4-diazabicyclo[2.2.2] octane)butyl cations or 1,5-(1,4-diazabicyclo[2.2.2]octane) pentyl cations is associated with an anion selected from the group consisting of fluoride, chloride, bromide, iodide, hydroxide, acetate, sulfate, tetrafluoroborate, carboxylate, carbonate and bicarbonate.

17. The composition of claim 15, wherein the compound comprising either 1,4-(1,4-diazabicyclo[2.2.2] octane)butyl cations or 1,5-(1,4-diazabicyclo[2.2.2]octane) pentyl cations is associated with a bromide anion.

18. The composition of claim 15, where the compound comprising 1,4-(1,4-diazabicyclo[2.2.2] octane)butyl cations is 1,4-(1,4-diazabicyclo[2.2.2]octane)butyl dibromide (diDABCO-C4).

19. The composition of claim 15, where the compound comprising 1,5-(1,4-diazabicyclo[2.2.2]octane) pentyl cations is 1,5-(1,4-diazabicyclo[2.2.2]octane)pentyl dibromide (diDABCO-05).

20. The composition of claim 15, where the lower alkyl ammonium hydroxide comprises tetrabutylammonium hydroxide.

21. The composition of claim 15, wherein the composition is essentially free of fluoride.

22. The composition of claim 15, wherein the composition is a gel having a molar compositional ratio of:

| | |
|---|---|
| P/A | 0.5-0.99 |
| MeO$_2$/A | 0.02-1.0 |
| SDA1/A | 0.1-0.6 |
| SDA2/A | 0.1-0.6 |
| Lower alkyl ammonium hydroxide/A | 0.1-0.6 |
| H$_2$O/A | 20-200 | where P the source of phosphorous and is calculated as being in the oxide form (P$_2$O$_5$), A is Al, Fe, Cr, B, Ga or combinations thereof and is calculated as being in the oxide form (A$_2$O$_3$); Me is Si, Ge, Mg or combinations thereof and is calculated as being in the oxide form (MO$_2$), and, where SDA1 comprises either 1,4-(1,4-diazabicyclo[2.2.2] octane) butyl cations or 1,5-(1,4-diazabicyclo[2.2.2]octane) pentyl cations and, where SDA2 comprises a lower alkyl amine.

23. The composition of claim 15, wherein the reaction mixture further comprises from about 0.1 to about 10% w/w of seed material, wherein the seed material comprises a crystalline molecular sieve having an AFX framework.

24. The composition of claim 15, where the composition, upon reacting, forms a SAPO-56.

25. A catalyst composition comprising a calcined SAPO-56, where the calcined SAPO-56 is formed from a SAPO-56 comprising trimethylamine and either 1,4-(1,4-diazabicyclo[2.2.2]octane)butyl cations or 1,5-(1,4-diazabicyclo[2.2.2]octane)pentyl cations.

* * * * *